(12) United States Patent
Kanemitsu et al.

(10) Patent No.: US 8,559,747 B2
(45) Date of Patent: Oct. 15, 2013

(54) IMAGE PROCESSING APPARATUS, IMAGE PROCESSING METHOD, AND CAMERA MODULE

(75) Inventors: Shiroshi Kanemitsu, Kanagawa (JP); Kazuhiro Tabuchi, Kanagawa (JP); Takaaki Kawakami, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 212 days.

(21) Appl. No.: 13/158,588

(22) Filed: Jun. 13, 2011

(65) Prior Publication Data

US 2012/0045144 A1 Feb. 23, 2012

(30) Foreign Application Priority Data

Aug. 23, 2010 (JP) .................................. 2010-186517

(51) Int. Cl.
*G06K 9/40* (2006.01)

(52) U.S. Cl.
USPC ............ 382/266; 382/260; 382/274; 382/275; 358/3.26; 358/3.27; 358/463

(58) Field of Classification Search
USPC ........ 382/260, 266, 274, 275; 358/3.26, 3.27, 358/463
See application file for complete search history.

(56) References Cited

U.S. PATENT DOCUMENTS

| | | | |
|---|---|---|---|
| 7,208,696 B2 * | 4/2007 | Yang | 219/121.65 |
| 7,505,604 B2 * | 3/2009 | Zakrzewski et al. | 382/100 |
| 7,773,115 B2 * | 8/2010 | Estevez et al. | 348/208.13 |
| 7,973,827 B2 * | 7/2011 | Motomura et al. | 348/222.1 |
| 8,102,445 B2 | 1/2012 | Kanemitsu et al. | |
| 8,275,218 B2 * | 9/2012 | Lin et al. | 382/299 |

FOREIGN PATENT DOCUMENTS

| | | |
|---|---|---|
| JP | 10-164371 A | 6/1998 |
| JP | 2000-115526 | 4/2000 |
| JP | 2003-123063 A | 4/2003 |
| JP | 2004-88285 A | 3/2004 |
| JP | 2004-282593 | 10/2004 |
| JP | 2009-94862 | 4/2009 |
| JP | 2009-200884 | 9/2009 |
| JP | 2009-206552 | 9/2009 |
| JP | 2010-45534 A | 2/2010 |
| JP | 2010-68361 A | 3/2010 |

OTHER PUBLICATIONS

Japanese Office Action issued Jan. 22, 2013 in Patent Application No. 2010-186517 with English Translation.
Notice of Rejection/Office Action mailed Jun. 25, 2013, in Japanese Patent Application No. 2010-186517 filed Aug. 23, 2010.

* cited by examiner

*Primary Examiner* — Yosef Kassa
(74) *Attorney, Agent, or Firm* — Oblon, Spivak, McClelland, Maier & Neustadt, L.L.P.

(57) ABSTRACT

In an image processing apparatus according to one embodiment, an edge correcting unit replaces a signal level of a target pixel with a maximum value of signal levels of a plurality of peripheral pixels when a sum of the signal level of the target pixel and the edge information is more than the maximum value, and the edge correcting unit replaces the signal level of the target pixel with a minimum value of the signal levels of the plurality of peripheral pixels when a sum of the signal level of the target pixel and the edge information is less than the minimum value.

15 Claims, 8 Drawing Sheets

IMAGE PROCESSING APPARATUS, IMAGE PROCESSING METHOD, AND CAMERA MODULE

CROSS-REFERENCE TO RELATED APPLICATIONS

This application is based upon and claims the benefit of priority from the prior Japanese Patent Application No. 2010-186517, filed on Aug. 23, 2010; the entire contents of all of which are incorporated herein by reference.

FIELD

Embodiments described herein relate generally to an image processing apparatus, an image processing method, and a camera module.

BACKGROUND

Recently, in order to reduce the cost and decrease the thickness, there are cases where a camera module, which is mounted in a cellular phone or the like, is configured by a small number of lenses or lenses having a low modulation transfer function (MTF) characteristic. As a technique for apparently reducing blurring of an image by performing digital signal processing, for example, an edge emphasis process using a band pass filter (BPF) is known.

In the edge emphasis process, a value is added to an edge portion (addition of an overshoot) or is subtracted from the edge portion (addition of an undershoot) by performing a predetermined process for an edge component that is extracted by the BPF. When an image including a dull edge portion is obtained due to the use of lenses having a low MTF characteristic, in the edge emphasis process performed based on the image, there is a problem in that blurring or a noise is generated due to expansion of an overshoot or an undershoot.

As a technique for solving such a problem, for example, there are cases where blurring correction is applied through an extended depth of field (EDOF) process. In applying the EDOF process, a special lens for the EDOF process is required, and digital processing that is appropriate for the performance of the lens needs to be performed.

The application of the EDOF process leads to a decrease in the versatility, an increase in circuit size, an increase in required memory capacity, and the like due to the necessity of a special configuration used for the EDOF process, and accordingly, there are problems from the viewpoints of the chip size and the power consumption.

DETAILED DESCRIPTION

In general, according to one embodiment, an image processing apparatus includes an edge information extracting unit and an edge correcting unit. The edge information extracting unit extracts edge information from an image signal before an interpolation process. The edge correcting unit performs edge correction based on the edge information extracted by the edge information extracting unit. When a sum of the signal level of a target pixel and the edge information is more than a maximum value of signal levels of a plurality of peripheral pixels, the edge correcting unit performs edge correction in which the signal level of the target pixel is replaced with the maximum value. The peripheral pixels are positioned on the periphery of the target pixel. On the other hand, when a sum of the signal level of the target pixel and the edge information is less than a minimum value of the signal levels of the plurality of the peripheral pixels, the edge correcting unit performs edge correction in which the signal level of the target pixel is replaced with the minimum value.

Exemplary embodiments of an image processing apparatus, an image processing method, and a camera module according to embodiments will be explained below in detail with reference to the accompanying drawings. The present invention is not limited to the following embodiments.

Figure 1:
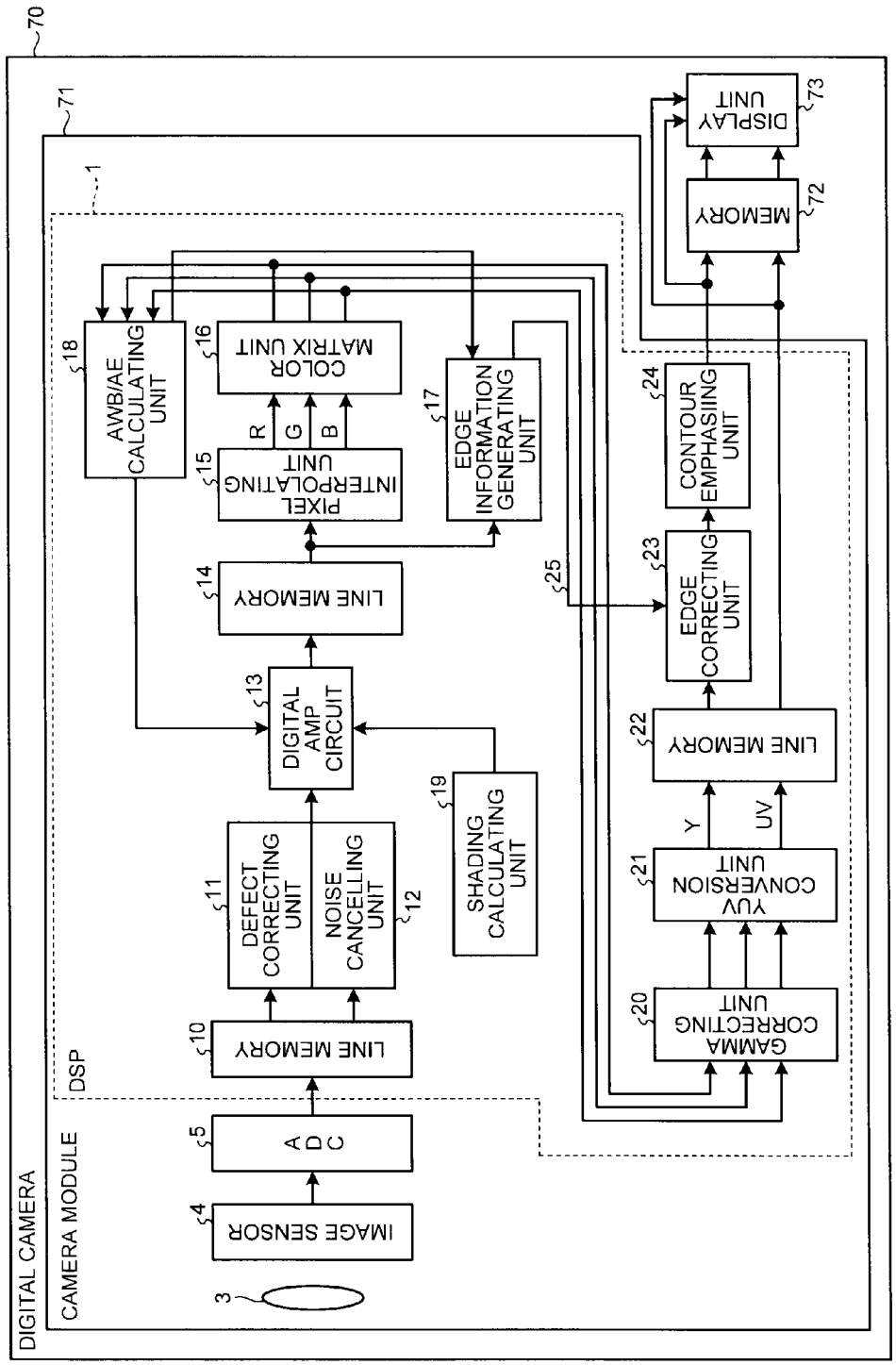
FIG. 1 is a block diagram of a digital camera to which an image processing apparatus according to a first embodiment is applied.

FIG. 1 is a block diagram of a digital camera to which an image processing apparatus according to a first embodiment is applied. The digital camera 70 includes a camera module 71, a memory 72, and a display unit 73. The camera module 71 captures an image of a subject. The memory 72 stores the image captured by the camera module 71 therein. The display unit 73 displays the image captured by the camera module 71. The display unit 73, for example, is a liquid crystal display.

The camera module 71 outputs an image signal to the memory unit 72 and the display unit 73 as a result of the capturing of the subject image. The memory 72 outputs the image signal to the display unit 73 in response to user's operations or the like. The display unit 73 displays an image based on the image signal that is input from the camera module 71 or the memory 72.

The camera module 71 includes a digital signal processor (DSP) 1, a lens unit 3, an image sensor 4, and an analog to digital converter (ADC) 5. The lens unit 3 receives in the light from the subject and forms a subject image in an image sensor 4.

The image sensor 4 captures a subject image by converting the light received by the lens unit 3 into electric charge. The image sensor 4 takes in the signal levels of red (R), green (G), and blue (B) in the order corresponding to the Bayer array and generates analog image signals. The ADC 5 converts the image signals transmitted from the image sensor 4 from analog to digital.

The DSP 1 performs various image processes for the digital image signal transmitted from the ADC 5. A line memory 10 that is arranged in the DSP 1 temporarily stores the digital image signal transmitted from the ADC 5. A defect correcting unit 11 and a noise cancelling unit 12 use the line memory 10 in a shared manner.

The defect correcting unit 11 performs defect correction, which is used for correcting an absent portion (defect) of the digital signal due to a pixel that does not normally function in the image sensor 4, for the digital image signal transmitted from the line memory 10. The noise cancelling unit 12 performs a noise cancelling process for noise reduction. A shading calculating unit 19 calculates a shading correction coefficient that is used for performing shading correction.

A digital amplifier (AMP) circuit 13 calculates a digital AMP coefficient based on a coefficient calculated by an AWB/AE calculating unit 18 to be described below and the shading correction coefficient calculated by the shading calculating unit 19. In addition, the digital AMP circuit 13 multiplies the digital image signal, on which the processes of the defect correcting unit 11 and the noise cancelling unit 12 have been performed, by the digital AMP coefficient.

A line memory 14 temporarily stores the digital image signal that has been multiplied by the digital AMP coefficient. A pixel interpolating unit 15 generates sensitivity signals of RGB through an interpolation process (demosaic process) of the digital image signals transmitted from the line memory 14 in the order of the Bayer array. A color matrix unit 16 performs a color matrix calculating process (color reproducibility process), which is used for acquiring color reproducibility, on the sensitivity signals of RGB.

An edge information generating unit 17 generates edge information 25 based on the pre-interpolation image signal (hereinafter, appropriately referred to as a "raw image") existing before the interpolation process performed by the pixel interpolating unit 15. The pixel interpolating unit 15 and the edge information generating unit 17 use the line memory 14 in a shared manner. The AWB/AE calculating unit 18 calculates coefficients used for auto white balance (AWB) adjustment and auto exposure (AE) adjustment based on the sensitivity signals of RGB.

The gamma correcting unit 20 performs gamma correction, which is used for correcting the gray scales of an image, on the sensitivity signals of RGB. A YUV conversion unit 21 converts an image signal from the RGB type to the YUV type (for example, YUV 422 or the like) by generating a luminance (Y) signal and color difference (UV) signals based on the sensitivity signals of RGB. A line memory 22 temporarily stores the Y signal and the UV signals transmitted from the YUV conversion unit 21.

An edge correcting unit 23 performs edge correction, which is used for reducing dulling (blurring) of an edge portion of an image, based on the edge information 25 that is generated by the edge information generating unit 17. The edge correcting unit 23 performs the edge correction for the Y signal acquired by the conversion process of the YUV conversion unit 21.

A contour emphasizing unit 24 performs a contour emphasis process on the Y signal which has been subjected to the edge correction by the edge correcting unit 23. The contour emphasizing unit 24 performs the contour emphasis by using a correction coefficient calculated based on image capture conditions of the image sensor 4 and the position of each pixel. The DSP 1 outputs the Y signal which has been subjected to the contour emphasis process by the contour emphasizing unit 24 and the UV signals stored in the line memory 22.

Figure 2:
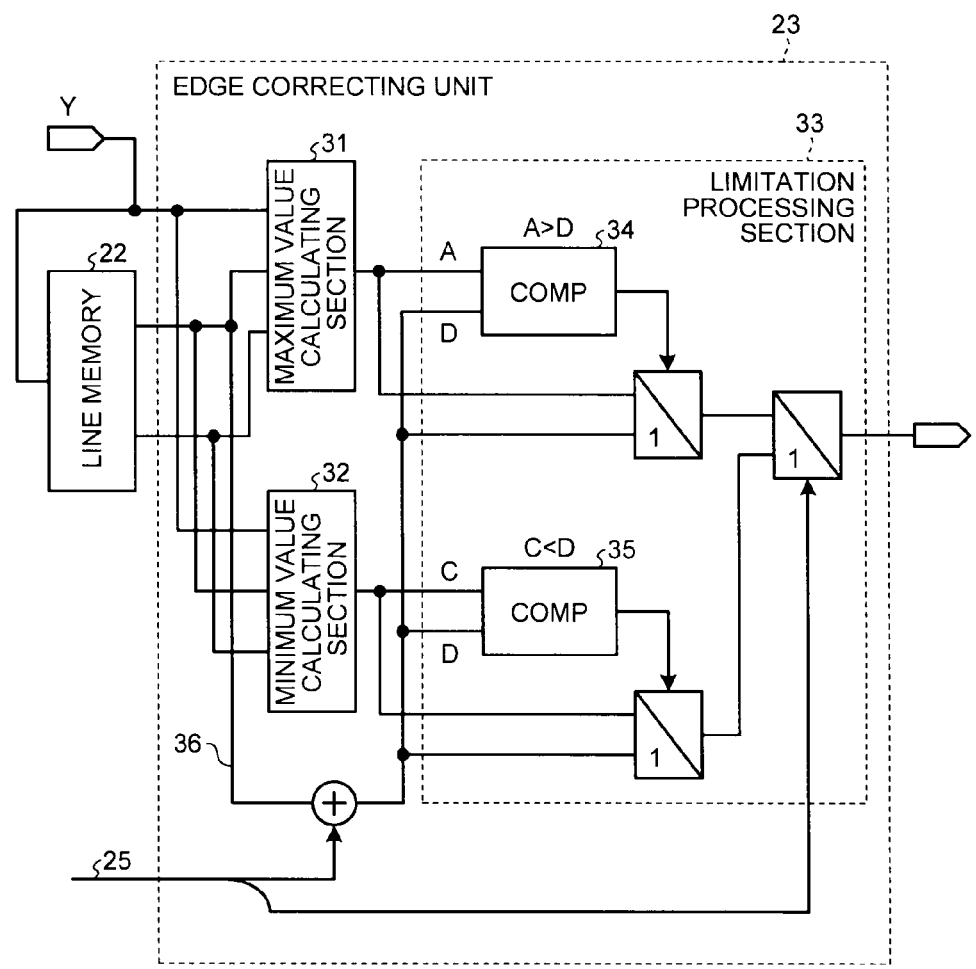
FIG. 2 is a block diagram illustrating an edge correcting unit in detail.

FIG. 2 is a block diagram illustrating the edge correcting unit in detail. The line memory 22 holds digital image signals corresponding to two lines. The edge correcting unit 23 is supplied with data of total three lines including data of two lines held in the line memory 22 and data of one line that is just ready to be input to the line memory 22 is input.

Figure 3:
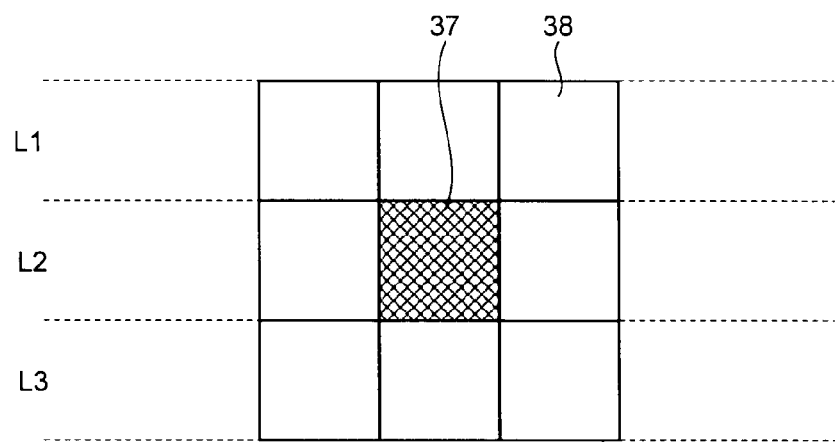
FIG. 3 is a diagram illustrating the arrangement of a target pixel and peripheral pixels.

FIG. 3 is a diagram illustrating the arrangement of a target pixel and peripheral pixels. The target pixel 37 and the peripheral pixels 38, for example, are included in a matrix of three same color pixels in the horizontal direction and three lines L1, L2, and L3 including the same color pixels in the vertical direction out of pixels arranged in a Bayer array in the horizontal and vertical directions. The target pixel 37 is a pixel that is positioned at the center of the 3×3 matrix. The peripheral pixels 38 are eight pixels positioned on the periphery of the target pixel 37. In addition, the peripheral pixels 38 are not limited to a case of eight peripheral pixels being disposed for one target pixel 37, and the number of the peripheral pixels 38 is arbitrary.

A maximum value calculating section 31 calculates a maximum value A of the signal levels (hereinafter, briefly referred to as a "maximum value") of the eight peripheral pixels 38. A minimum value calculating section 32 calculates a minimum value C of the signal levels (hereinafter, briefly referred to as a "minimum value") of the eight peripheral pixels 38. The edge correcting unit 23 adds the edge information 25 generated by the edge information generating unit 17 to the signal level (main line signal) 36 of the target pixel 37. A limitation processing section 33 performs a process of limiting edge correction in accordance with the conditions.

A comparator (COMP) 34 that is connected to the maximum value calculating section 31 compares the maximum value A calculated by the maximum value calculating section 31 with the sum D of the signal level 36 of the target pixel 37 and the edge information 25. When the condition of "A>D" is satisfied, the COMP 34, for example, outputs "1." On the other hand, when the condition of "A>D" is not satisfied, the COMP 34, for example, outputs "0."

A COMP 35 that is connected to the minimum value calculating section 32 compares the minimum value C calculated by the minimum value calculating section 32 with the sum D of the signal level 36 of the target pixel 37 and the edge information 25. When the condition of "C<D" is satisfied, the COMP 35, for example, outputs "1." On the other hand, when the condition of "C<D" is not satisfied, the COMP 35, for example, outputs "0."

The limitation processing section 33 selects a signal level to be applied to the target pixel 37 through edge correction based on the sign of the edge information 25 (for example, denoted by "1" when the edge information 25 is negative or by "0" when the edge information 25 is positive) and the comparison results of the COMPs 34 and 35. Here, the sign of the edge information 25 represents a difference between the signal levels of adjacent pixels.

When the edge information 25 is positive, and the condition of "A>D" is satisfied in the COMP 34, the limitation processing section 33 selects the sum D. On the other hand, when the edge information 25 is positive, and the condition of "A>D" is not satisfied in the COMP 34, the limitation processing section 33 selects the maximum value A.

As above, the edge correcting unit 23 performs edge correction in which the signal level 36 of the target pixel 37 is replaced with the maximum value A when the edge information 25 is positive and the sum D is the maximum value A or more. The edge correcting unit 23 sets the maximum value A to the upper limit of the signal level to be assigned to the target pixel 37 when the edge information 25 is positive.

When the edge information 25 is negative and the condition of "C<D" is satisfied in the COMP 35, the limitation processing section 33 selects the sum D of the signal level 36 of the target pixel 37 and the edge information 25. On the other hand, when the edge information 25 is negative and the condition of "C<D" is not satisfied in the COMP 35, the limitation processing section 33 selects the minimum value C.

As above, the edge correcting unit 23 performs edge correction in which the signal level 36 of the target pixel 37 is replaced with the minimum value C when the edge information 25 is negative and the sum D is the minimum value C or less. The edge correcting unit 23 sets the minimum value B to the lower limit of the signal level to be assigned to the target pixel 37 when the edge information 25 is negative.

Figure 4A:
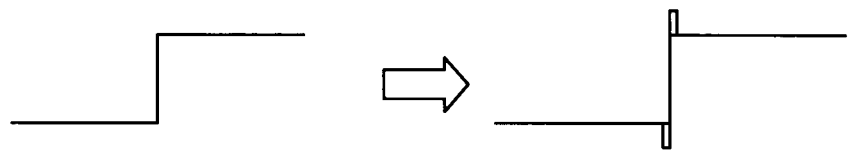
FIGS. 4A to 4D are diagrams illustrating edge correction.

FIGS. 4A to 4D are diagrams illustrating the edge correction. FIG. 4A illustrates an example in which an edge emphasis process is performed for a sharp edge portion. The steeper a change in signal level is, the less an overshoot or an undershoot results, so ideal edge emphasis with less blurring can be made.

Figure 4B:
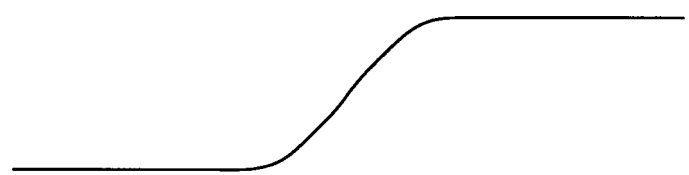
Figure 4C:
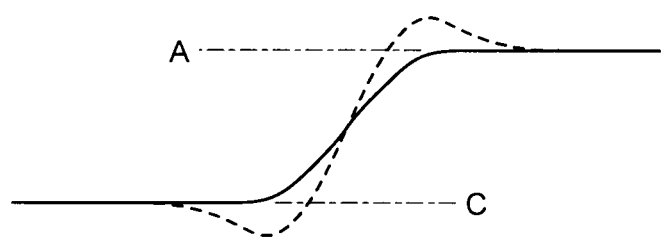

In contrast to this, a case is assumed in which an edge emphasis process of increasing a change in signal level, similarly to the conventional technology, is performed for an edge portion in which a change in the signal level is gentle as illustrated in FIG. 4B. In such a case, as indicated by a broken line in FIG. 4C, the edge emphasis process influences a portion where the change in signal level starts and a portion where the change in signal level ends. Accordingly, an overshoot or undershoot expands, and thus blurring becomes more severe in some cases. On the other hand, in an edge emphasis process that is performed based on an image including a dull edge portion, the signal level is excessively lifted up and then push down, which results in a problem of noise generation.

Figure 4D:
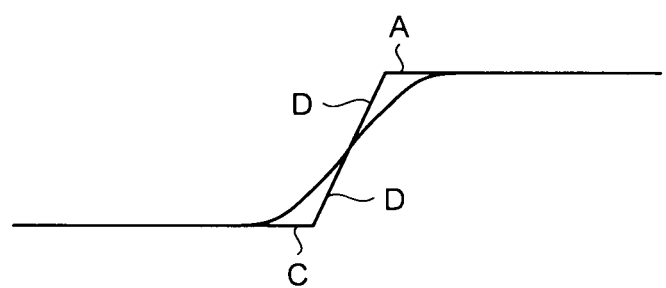

The edge correcting unit 23 according to this embodiment limits the signal level that is to be assigned to the target pixel 37 between the maximum value A and the minimum value C. Accordingly, the edge correcting unit 23, as illustrated in FIG. 4D can perform edge correction of suppressing the dulling of the edge portion.

Figure 5:
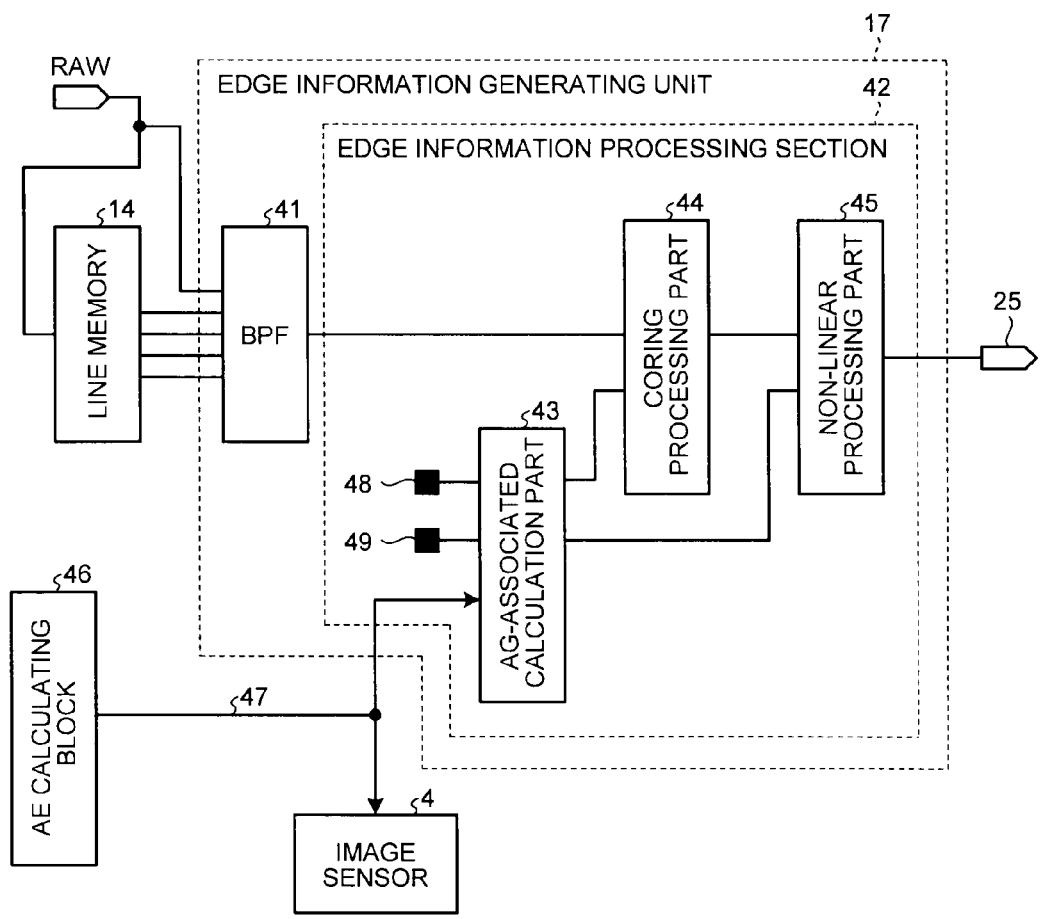
FIG. 5 is block diagram illustrating an edge information generating unit in detail.

FIG. 5 is block diagram illustrating the edge information generating unit in detail. The edge information generating unit 17 includes a BPF 41 and an edge information processing section 42. The BPF 41 serves as an edge information extracting unit that extracts the edge information 25 from a raw image. The edge information processing section 42 performs a process of associating the edge information 25 extracted by the BPF 41 with the analog gain (AG).

The line memory 14 holds digital image signals corresponding to four lines. The BPF 41 is supplied with data of total five lines including data of four lines that are held in the line memory 14 and data of one line that is just ready to be input to the line memory 14 is input.

An AE calculating block 46 is included in the AWB/AE calculating unit 18 illustrated in FIG. 1. The AE calculating block 46 calculates an AG 47 and outputs the AG 47 to the edge information generating unit 17 and the image sensor 4.

The edge information processing section 42 includes an AG-associated calculation part 43, a coring processing part 44, and a non-linear processing part 45. The edge information processing section 42 holds a coring value 48 and a gain value 49 that are set in advance. The AG-associated calculation part 43 performs calculation for changing the coring value 48 and the gain value 49 that are held by the edge information processing section 42 along with a change in the AG 47.

Figure 6:
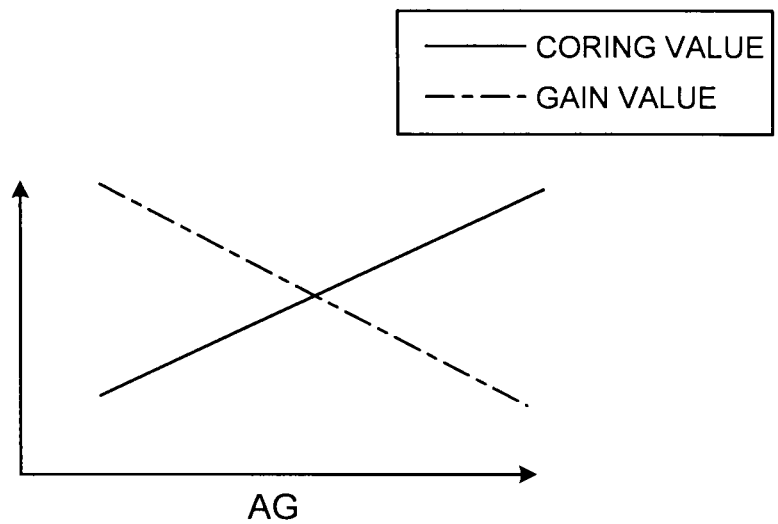
FIG. 6 is a diagram illustrating the relationship between an analog gain (AG) and a coring value and a gain value that are output by an AG-associated calculation part.

FIG. 6 is a diagram illustrating the relationship between the AG, and the coring value and the gain value that are output by the AG-associated calculation part. AG-associated calculation part 43 performs calculation for increasing the coring value 48 along with an increase in the AG 47. In addition, the AG-associated calculation part 43 performs calculation for decreasing the gain value 49 along with an increase in the AG 47. Here, the darker the subject is, a higher value is set as the AG 47.

The coring processing part 44 performs a coring process in which the coring value 48 which has been subjected to the calculation process of the AG-associated calculation part 43 is used for the edge information 25 extracted by the BPF 41. When the absolute value of the signal level is less than the coring value 48, the coring processing part 44 sets zero to the signal level.

The non-linear processing part 45 performs a non-linear process in which the gain value 49 which has been subjected to the calculation process of the AG-associated calculation part 43 is used for the edge information 25 which has been subjected to the coring process of the coring processing part 44.

As above, the edge information processing section 42 changes the coring value 48 for use in the coring process and the gain value 49 for use in the non-linear process to be suitable for a bright subject or to be suitable for a dark subject. Accordingly, the edge correcting unit 23 can appropriately perform the edge correction in accordance with the brightness of the subject.

In addition, the change of the coring value 48 and the gain value 49 may not be limited to the linear relationship with the change in the AG, but be associated in any other forms with the change of the AG. The edge information processing section 42 is not limited to the case of performing both the coring process and the non-linear process. That is, performing at least one of them may be satisfactory. Furthermore, the edge information processing section 42 may be configured to perform a process other than the coring process and the non-linear process for the edge information 25 extracted by the BPF 41.

By applying the edge correcting unit 23, the DSP 1 can reduce the blurring in the edge portion with a relatively simple configuration as compared with a case where a special configuration for an EDOF process or the like is provided. As above, the DSP 1 can correct the dulling of the edge portion included in an image with a simple configuration.

The edge correcting unit 23 may be configured to be switched between On and Off of the edge correction in accordance with the edge information extracted by the BPF 41, the AG 47 calculated by the AE calculating block 46, luminance information, or the like. In such a case, the DSP 1 is switched between On and Off of the edge correction in accordance with the photographing conditions, whereby incorrect correction can be suppressed.

Figure 7:
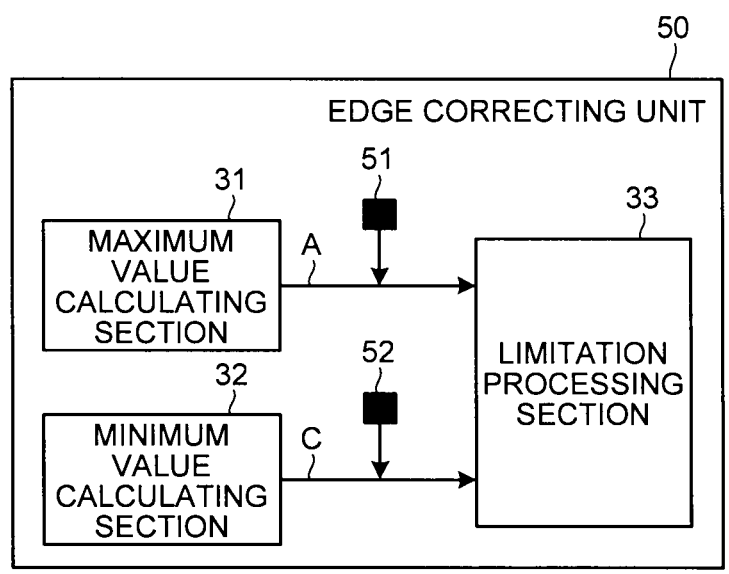
FIG. 7 is a block diagram of an edge correcting unit that is applied to an image processing apparatus according to a second embodiment.

FIG. 7 is a block diagram of an edge correcting unit that is applied to an image processing apparatus according to a second embodiment. The edge correcting unit 50 according to this embodiment applies offsets to the maximum value A and the minimum value C. The same portions as those of the first embodiment are denoted by the same reference numerals, and the duplicate description will not be made.

The edge correcting unit 50 holds an offset value 51 that is set in advance for the maximum value A and an offset value 52 that is set in advance for the minimum value C. The edge correcting unit 50 adds the offset value 51 to the maximum value A that is calculated by the maximum value calculating unit 31. When the edge information 25 (see FIG. 1) is positive, the edge correcting unit 50 performs edge correction with a value acquired by adding the offset value 51 to the maximum value A used as the upper limit.

In addition, the edge correcting unit 50 subtracts the offset value 52 from the minimum value C calculated by the minimum value calculating section 32. On the other hand, when the edge information 25 is negative, the edge correcting unit 50 performs edge correction with a value acquired by subtracting the offset value 52 from the minimum value C used as the lower limit.

By applying the edge correcting unit 50, the DSP 1 can correct the dulling of the edge portion with a simple configuration. In addition, the DSP 1 applies the offsets to the maximum value A and the minimum value C that are used for limiting the edge correction, so that an effect of emphasizing the edge through addition of a shoot can be acquired.

The offset values 51 and 52 may change in associated with the AG. In such a case, the edge correcting unit 50 can reduce the influence of the noise on the edge correction. Operation of the edge correcting unit 50 is not limited to applying the offsets to both the maximum value A and the minimum value C. Alternatively, the edge correcting unit 50 may apply an offset to at least one of the maximum value A and the minimum value C. In this case, the DSP 1 can acquire the effect of emphasizing the edge through the addition of at least one of an overshoot and an undershoot.

Figure 8:
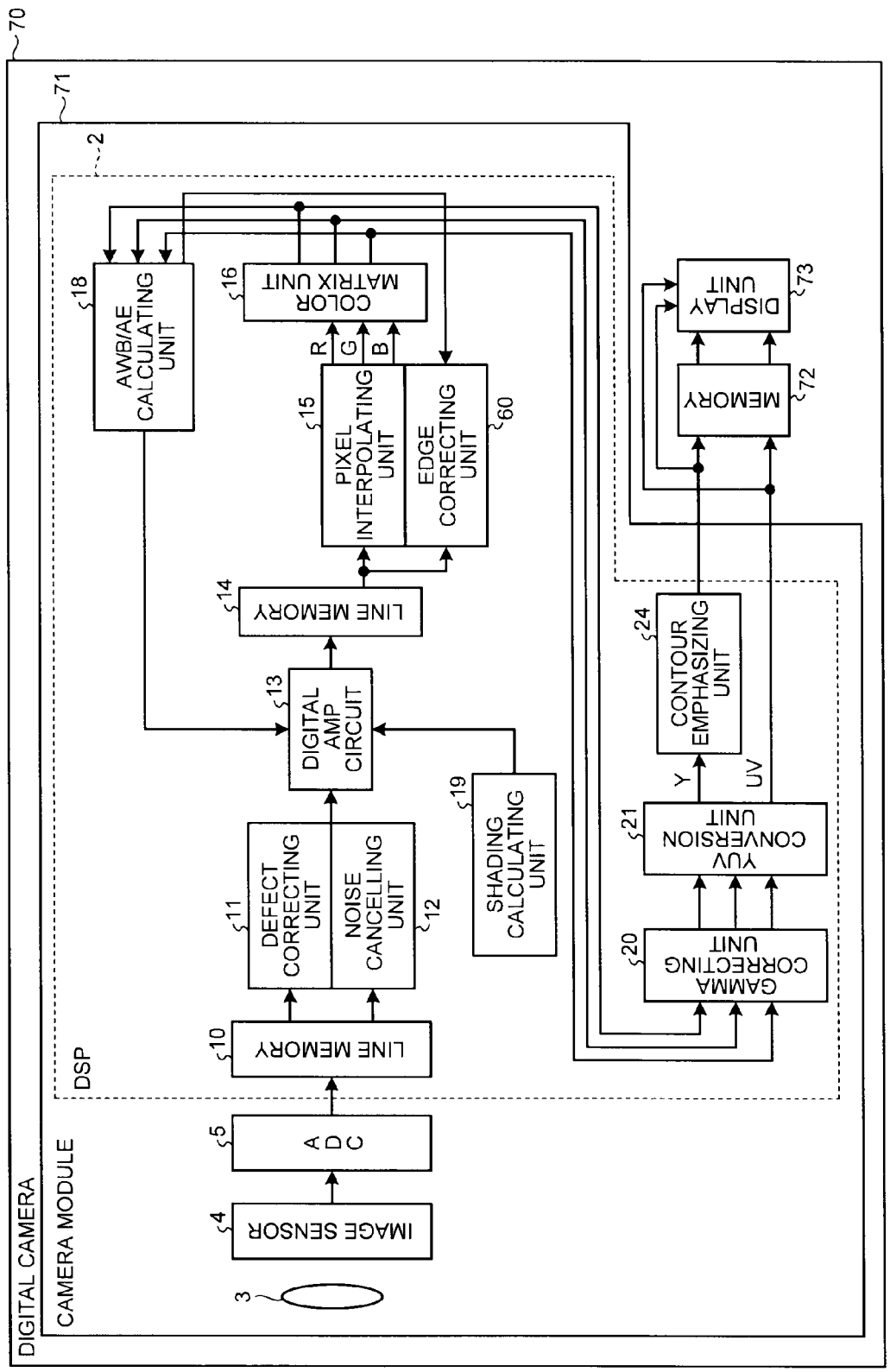
FIG. 8 is a block diagram of a digital camera to which an image processing apparatus according to a third embodiment is applied.

FIG. 8 is a block diagram of a digital camera to which an image processing apparatus according to a third embodiment is applied. A DSP 2 as an image processing apparatus according to this embodiment includes an edge correcting unit 60 that performs edge correction for a raw image. The same reference numerals are assigned to the same portions as those of the first embodiment, and duplicate description will be not made here.

A pixel interpolating unit 15 and an edge correcting unit 60 use a line memory 14 in a shared manner. The edge correcting unit 60 performs edge correction for a digital image signal that has been multiplied by a digital AMP coefficient by a digital AMP circuit 13 as its target. A contour emphasizing unit 24 performs a contour emphasis process for a Y signal that is acquired through the conversion process of a YUV conversion unit 21 as its target.

Figure 9:
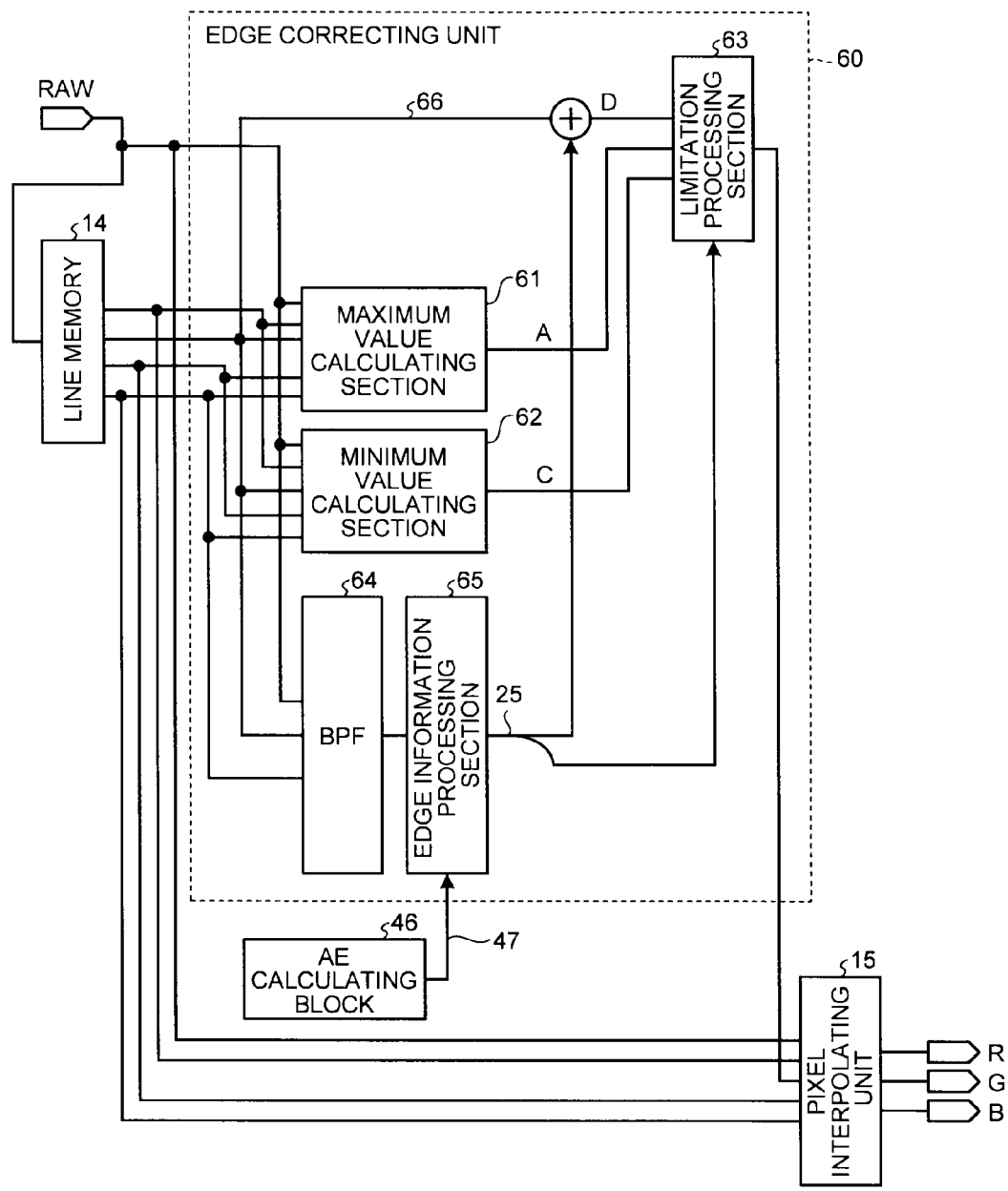
FIG. 9 is a block diagram illustrating an edge correcting unit in detail.

FIG. 9 is a block diagram illustrating the edge correcting unit in detail. The line memory 14 holds digital image signals corresponding to four lines. The edge correcting unit 60 is supplied with data of total five lines including data of four lines that is held in the line memory 14 and data of one line that is just ready to be input to the line memory 14 is input.

Figure 10:
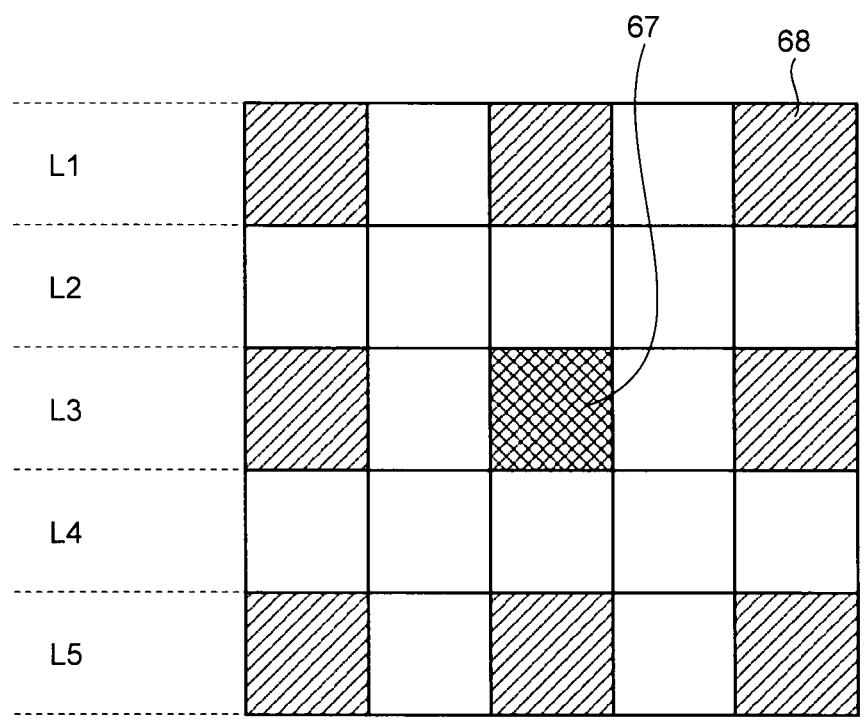
FIG. 10 is a diagram illustrating the arrangement of a target pixel and peripheral pixels.

FIG. 10 is a diagram illustrating the arrangement of a target pixel and peripheral pixels. The target pixel 67 and the peripheral pixels 68, for example, are included in a matrix of five pixels in the horizontal direction and five lines L1 to L5 along the vertical direction out of pixels arranged in a Bayer array in the horizontal and vertical directions. The target pixel 67 is a pixel that is positioned at the center of the 5×5 matrix. The peripheral pixels 68 are eight pixels for the same color as that of the target pixel 67 out of pixels positioned on the periphery of the target pixel 67. In addition, the peripheral pixels 68 are not limited to the pixels for the same color as that of the target pixel 67 but may be pixels for a color different from that of the target pixel 67, and the number of the peripheral pixels 68 may any number as long as it is plural.

The edge correcting unit 60 includes a maximum value calculating section 61, a minimum value calculating section 62, a limitation processing section 63, a BPF 64, and an edge information processing section 65. The maximum value calculating section 61 calculates a maximum value A of the signal levels of the eight peripheral pixels 68. The minimum value calculating section 62 calculates a minimum value C of the signal levels of the eight peripheral pixels 68.

The BPF 64 serves as an edge information extracting unit that extracts the edge information 25 from a raw image. The BPF 64 is supplied with data of total three lines, which includes data of two lines, out data of four lines held in the line memory 14, and data of one line that is just ready to be input to the line memory 14. One of the two lines input to the BPF 64 from the line memory 14 is assumed to be a line L3 that includes the target pixel 67.

The edge information processing section 65 performs a process of associating edge information 25 extracted by the BPF 64 with an AG 47. The BPF 64 and the edge information processing section 65 form an edge information generating unit that generates the edge information 25.

The limitation processing section 63 performs a process of limiting the edge correction in accordance with the conditions, similarly to the limitation processing section 33 (see FIG. 2) according to the first embodiment. The limitation processing section 63 compares the maximum value A calculated by the maximum value calculating section 61 with the sum D of the signal level 66 of the target pixel 67 and the edge information 25. In addition, the limitation processing section 63 compares the minimum value C calculated by the minimum value calculating section 62 with the sum D of the signal level 66 of the target pixel 67 and the edge information 25.

The limitation processing section 63 selects a signal level to be applied to the target pixel 67 as a result of the edge correction based on the sign of the edge information 25, the result of comparison between the maximum value A and the sum D, and the result of comparison between the minimum value C and the sum D.

When the edge information 25 is positive and the condition of "A>D" is satisfied, the limitation processing section 63 selects the sum D. On the other hand, when the edge information 25 is positive and the condition of "A>D" is not satisfied, the limitation processing section 63 selects the maximum value A.

As above, the edge correcting unit 60 performs edge correction in which the signal level 66 of the target pixel 67 is replaced with the maximum value A when the edge information 25 is positive and the sum D is the maximum value A or more. The edge correcting unit 60 sets the maximum value A to the upper limit of the signal level to be assigned to the target pixel 67, when the edge information 25 is positive.

When the edge information 25 is negative and the condition of "C<D" is satisfied, the limitation processing section 63 selects the sum D. On the other hand, when the edge information 25 is negative and the condition of "C<D" is not satisfied, the limitation processing section 63 selects the minimum value C.

As above, the edge correcting unit 60 performs edge correction in which the signal level 66 of the target pixel 67 is replaced with the minimum value C when the edge information 25 is negative and the sum D is the minimum value C or less. The edge correcting unit 60 sets the minimum value B to the lower limit of the signal level to be assigned to the target pixel 67, when the edge information 25 is negative.

The edge correcting unit 60 outputs the signal level selected by the limitation processing section 63. The pixel interpolating unit 15 performs an interpolation process for a raw image including a signal level obtained through the edge correction process of the edge correcting unit 60 as its target.

The edge correcting unit 60 according to this embodiment limits the signal level that is assigned to the target pixel 67 between the maximum value A and the minimum value C. Accordingly, the edge correcting unit 60 can perform edge correction of suppressing the dulling of the edge portion.

By applying the edge correcting unit 60, the DSP 2 can correct the dulling of the edge portion with a simple configuration. In the DSP 2, the target of the edge correction process of the edge correcting unit 60 is a raw image, and the line memory 14 is used by the edge correcting unit 60 and the pixel interpolating unit 15 in a shared manner. With is configuration, the DSP 2 can reduce the circuit size as compared with the case in which a line memory for used in edge correction is additionally provided as well as the line memory for use in the pixel interpolating process is provided.

The image processing apparatus according to any one of the first, second, and third embodiments may be also applied to an electronic apparatus besides the digital camera, for example, to a cellular phone with a built-in camera or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
   an edge information extracting unit that extracts edge information from an image signal that has not yet subjected to an interpolation process; and
   an edge correcting unit that performs edge correction on the basis of the edge information extracted by the edge information extracting unit,
   wherein the edge correcting unit performs the edge correction in which a signal level of a target pixel is replaced with a maximum value of signal levels of a plurality of peripheral pixels positioned on a periphery of the target pixel when a sum of the signal level of the target pixel and the edge information is more than the maximum value, and
   wherein the edge correcting unit performs the edge correction in which the signal level of the target pixel is replaced with a minimum value of the signal levels of the plurality of peripheral pixels when a sum of the signal level of the target pixel and the edge information is less than the minimum value.

2. The image processing apparatus according to claim 1,
   wherein the edge correcting unit performs the edge correction in which the signal level of the target pixel is replaced with the maximum value when the edge information extracted by the edge information extracting unit is positive, and the sum of the signal level of the target pixel and the edge information is more than the maximum value, and
   wherein the edge correcting unit performs the edge correction in which the signal level of the target pixel is replaced with the minimum value when the edge information extracted by the edge information extracting unit is negative, and the sum of the signal level of the target pixel and the edge information is less than the minimum value.

3. The image processing apparatus according to claim 1, further comprising:
   a line memory that holds the image signal; and
   a pixel interpolating unit that performs the interpolation process,
   wherein the pixel interpolating unit and the edge information extracting unit use the line memory in a shared manner.

4. The image processing apparatus according to claim 1,
   wherein the edge correcting unit performs the edge correction on a luminance signal that is obtained from the image signal which has been subjected to the interpolation process as a target.

5. The image processing apparatus according to claim 1,
   wherein the edge correcting unit performs the edge correction on the image signal that has not yet subjected to the interpolation process as a target.

6. The image processing apparatus according to claim 1, further comprising:
   an edge information processing unit that performs a process of associating the edge information extracted by the edge information extracting unit with an analog gain.

7. The image processing apparatus according to claim 1,
   wherein the edge correcting unit applies an offset to at least one of the maximum value and the minimum value.

8. An image processing method comprising:
   extracting edge information from an image signal that has not yet subjected to an interpolation process;
   performing an edge correction in which a signal level of a target pixel is replaced with a maximum value of signal levels of a plurality of peripheral pixels positioned on a periphery of the target pixel when a sum of the signal level of the target pixel and the edge information is more than the maximum value based on the extracted edge information; and
   performing an edge correction in which the signal level of the target pixel is replaced with a minimum value of the signal levels of the plurality of peripheral pixels when a sum of the signal level of the target pixel and the edge information is less than the minimum value based on the extracted edge information.

9. The image processing method according to claim 8,
   wherein the edge correction in which the signal level of the target pixel is replaced with the maximum value is performed when the extracted edge information is positive, and the sum of the signal level of the target pixel and the edge information is more than the maximum value, and
   wherein the edge correction in which the signal level of the target pixel is replaced with the minimum value is performed when the extracted edge information is negative, and the sum of the signal level of the target pixel and the edge information is less than the minimum value.

10. The image processing method according to claim 8, further comprising:
    maintaining the image signal in a line memory,
    wherein the extracting of edge information and the interpolation process are performed by using the image signal that is read out from the line memory that is used in a shared manner.

11. The image processing method according to claim 8,
    wherein the edge correction is performed on a luminance signal that is obtained from the image signal which has been subjected to the interpolation process as a target.

12. The image processing method according to claim 8,
    wherein the edge correction is performed on the image signal that has not yet subjected to the interpolation process as a target.

13. The image processing method according to claim 8, further comprising:
    performing a process of associating the extracted edge information with an analog gain.

14. The image processing method according to claim 8, wherein, in the edge correction, an offset is applied to at least one of the maximum value and the minimum value.

15. A camera module comprising:

a lens unit that receives in light from a subject;

an image sensor that generates an image signal according to the light received by the lens unit; and an image processing apparatus that performs image processing on the image signal transmitted from the image sensor, wherein the image processing apparatus comprises:

an edge information extracting unit that extracts edge information from an image signal that has not yet subjected to an interpolation process; and an edge correcting unit that performs edge correction on the basis of the edge information extracted by the edge information extracting unit, and wherein the edge correcting unit performs the edge correction in which a signal level of a target pixel is replaced with a maximum value of signal levels of a plurality of peripheral pixels positioned on a periphery of the target pixel when a sum of the signal level of the target pixel and the edge information is more than the maximum value, and wherein the edge correcting unit performs the edge correction in which the signal level of the target pixel is replaced with a minimum value of the signal levels of the plurality of peripheral pixels when a sum of the signal level of the target pixel and the edge information is less than the minimum value.

* * * * *